United States Patent [19]

Mackal

[11] 3,809,288

[45] Apr. 30, 1974

[54] INFLATION MANIFOLD

[76] Inventor: Glenn H. Mackal, 83 Chestnut Ridge Rd., Saddle River, N.J. 07458

[22] Filed: Mar. 26, 1973

[21] Appl. No.: 344,749

[52] U.S. Cl. .......................... 222/5, 9/316, 141/19
[51] Int. Cl. ............................................. B63c 9/24
[58] Field of Search .................................. 222/3–6; 9/316, 319, 320, 322, 324; 141/17, 19, 329, 330, 363

[56] References Cited
UNITED STATES PATENTS

| | | |
|---|---|---|
| 3,266,669 | 8/1966 | Vuyosevich .......................... 9/316 X |
| 2,778,434 | 1/1957 | Hastert ................................ 222/5 X |
| 2,894,658 | 7/1959 | Spidy .................................. 222/5 |

FOREIGN PATENTS OR APPLICATIONS

| | | |
|---|---|---|
| 710,196 | 6/1954 | Great Britain ......................... 222/5 |

Primary Examiner—Allen N. Knowles
Assistant Examiner—Thomas F. Kocovsky

[57] ABSTRACT

A manifold for use with an inflatable article such as a life vest, life raft, and the like, an improved handle for a lanyard for operating the capsule containing compressed gas mounted on the manifold, a method of and an apparatus for forming such lanyard handle and securing it to the lanyard cord, and an improved means for securing the lanyard cord to the capsule-piercing lever mounted on the manifold. The manifold body is preferably an integral molding of strong and impact-resistant plastic material having an internally threaded metal sleeve therein receiving the threaded neck of a compressed gas-containing capsule. The body of the manifold is so formed as to provide a continuous passage within the molded plastic material from adjacent the outer end of the capsule and within the metal insert sleeve into the chamber formed within the plastic body of the manifold, thereby eliminating what might otherwise be one or more possible leakage paths for the article-inflating gas as it travels from the capsule into the inflatable article.

3 Claims, 8 Drawing Figures

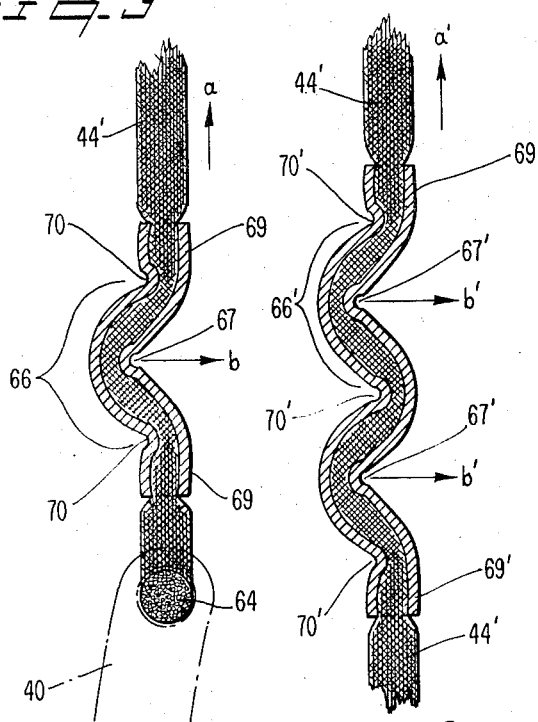
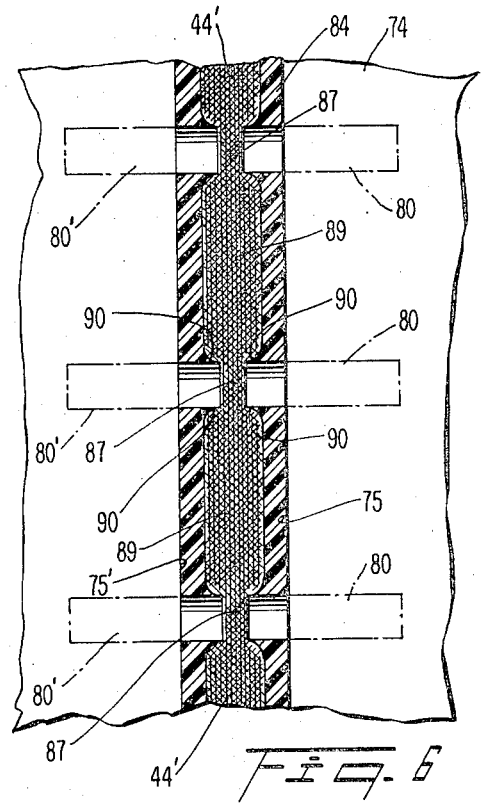
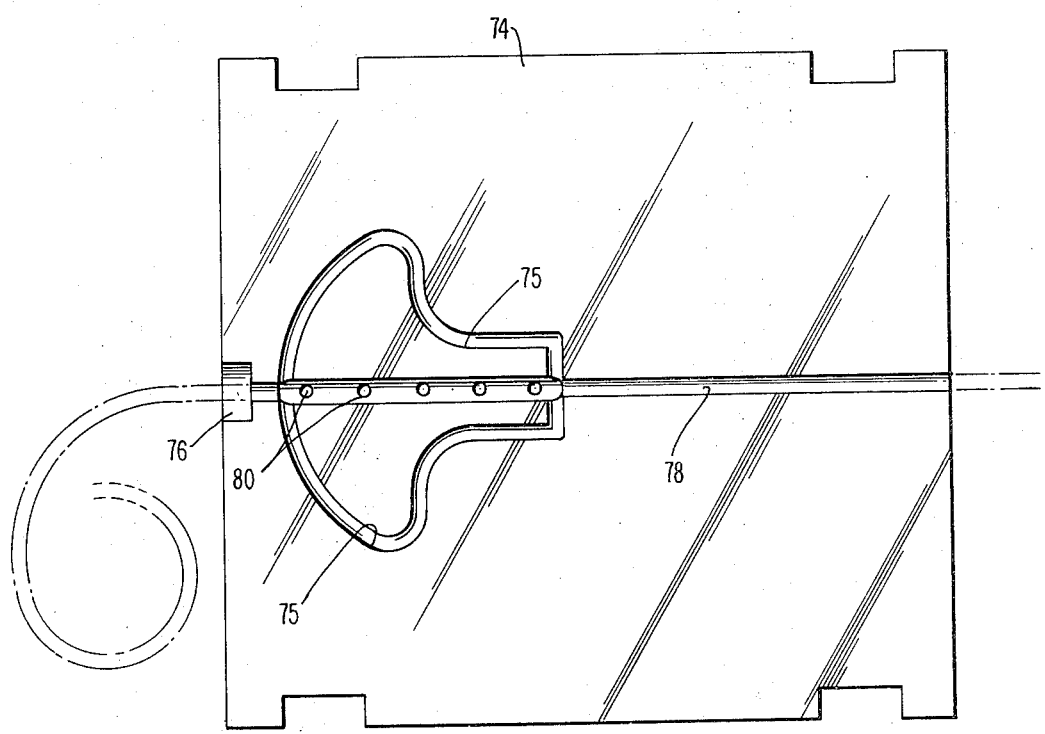

INFLATION MANIFOLD

This invention relates to an inflation manifold assembly, and to a method of and an apparatus for making certain parts of such assembly.

Although in its broader aspects the invention is not limited thereto, the invention is illustrated herein in connection with the use of the assembly in a $CO_2$ inflation manifold for use with an inflatable article such as a life vest, life raft, and the like. In the described assembly, the plastic flange or base, adapted for being heat-sealed to the wall of an inflatable article, has a central passage therethrough into which there extends the sleeve-like body of a check valve, such body being sealed to the mounting flange and locked against relative rotation with respect thereto. The combination of valve body and mounting flange is sealed to the sleeve portion of an inflation manifold in which the valve body is mounted. Such general combination of mounting flange, valve body, and inflation manifold is shown, for example, in application Ser. No. 218,669, filed Jan. 18, 1972, of which the present inventor is a co-inventor.

It is among the objects of the present invention to provide an inflation manifold of improved construction, the body of such manifold being integral and being made, for example, by being molded from plastic material.

A further object of the invention is the provision of an inflation manifold of the construction indicated immediately above, wherein the possibility of leakage of gas in its travel from the gas-containing capsule mounted on the manifold into the chamber within the manifold leading to the inflatable article is markedly reduced.

Yet another object of the invention lies in the provision of an improved device for securing the capsule-piercing lever-operating lanyard to the lever.

Further objects of the invention reside in the provision of an improved handle upon the lanyard cord, an improved method of mounting a handle upon the lanyard cord, and a novel and improved apparatus for forming the lanyard handle and securing it to the lanyard cord.

The above and further objects and novel features of the invention will more fully appear from the following description when the same is read in conjunction with the accompanying drawings. It is to be expressly understood, however, that the drawings are for the purpose of illustration only, and are not intended as a definition of the limits of the invention.

In the drawings, wherein like reference characters refer to like parts throughout the several views:

FIG. 5 is a view in longitudinal section on an enlarged scale of the lanyard cord-securing device;

FIG. 5a is a view similar to FIG. 5 of a modified cord-securing device;

FIG. 6 is a fragmentary view in longitudinal section through the central part of the lanyard handle, the lanyard cord being shown in elevation, the section being taken along the line 6—6 of FIG. 1; and FIG. 7 is a view in elevation of one-half of a plastic material injection mold for forming a lanyard handle in accordance with the invention and for securing it to the lanyard cord.

Figure 1:
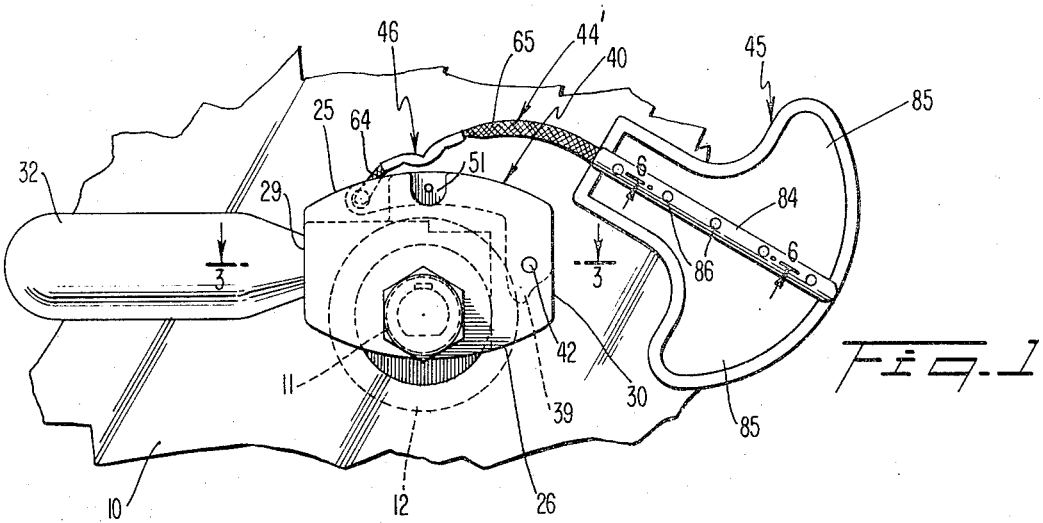
FIG. 1 is a view in elevation of a manifold according to the present invention, an inflatable body on which the manifold is mounted being shown fragmentarily.

In FIG. 1 there is shown a manifold and check valve assembly sealingly mounted upon a panel 10 of an inflatable article. The sleeve-like main body 11 of the check valve passes through and is sealed to a mounting flange 12 made of elastomeric material which is heat-sealable to the panel 10 of the inflatable article. Although obviously not limited thereto, the sleeve-like body of the valve and its manner of connection and sealing to the mounting flange may be the same as those shown and described in the above-referred to application, Ser. No. 218,669.

Figure 2:
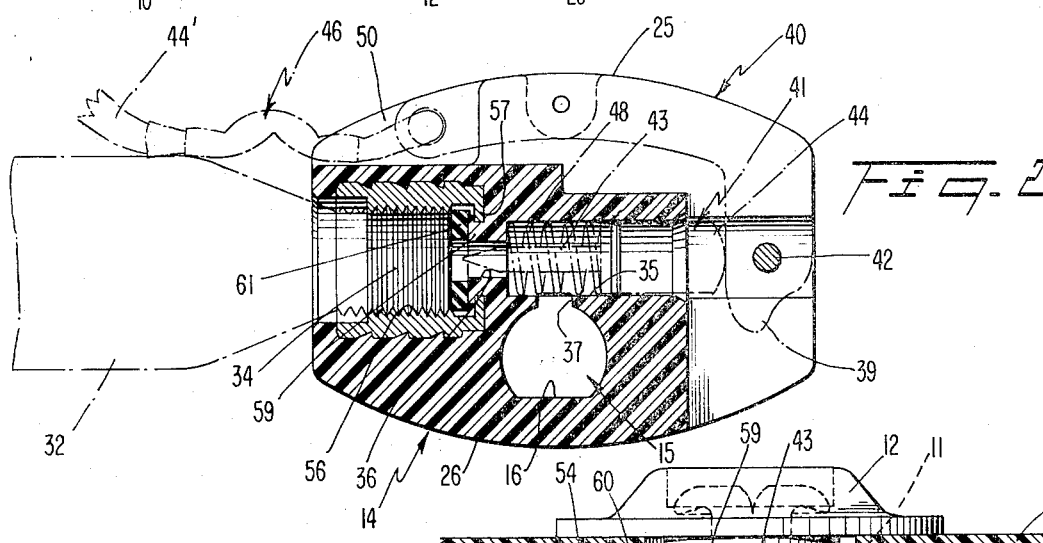
FIG. 2 is a view on an enlarged scale, partially in longitudinal vertical section and partially in elevation, of the inflation manifold of FIG. 1.

The illustrative inflation manifold in accordance with the present invention is designated generally by the reference character 14. The manifold has a passage 15 extending therethrough transverse to the broad extent of the manifold, the passage 15 having a flat side 16 on the bottom thereof as it is shown in FIGS. 1 and 2. The sleeve-like body 11 of the valve, which has an external configuration complementary to the cross-section of the passage 15, extends through such passage and is sealingly held therein by a cap nut 20 screwed onto the threaded outer end of the body 11, there being suitable washers interposed, on the one hand, between a flange adjacent the inner end of the body 11 and the body of the manifold, and, on the other hand, between the cap nut 20 and the body of the manifold on the other side thereof.

The embodiment of manifold shown in the drawings has a body 22 generally in the form of a thick disc having parallel front and rear sides 24, parallel longitudinally spaced ends 29, 30, and upper and lower surfaces 25, 26, respectively (FIGS. 1 and 2), of oppositely convex, part-circular cylindrical shape. At its left-hand end as it is shown in the drawings, the body 22 of the manifold is provided with means, to be described, for threadedly receiving the threaded neck 34 of a $CO_2$ cartridge 32 and sealing it to the gasconducting chamber 35 inwardly of the body 22 of the manifold. It is to be understood that the capsule 32 has a sealing disc of soft metal spanning its neck, such soft metal seal being adapted to be pierced when required, whereby to release the gas from the capsule so that it flows into the chamber 35 through a passage 36 and thence through an exit passage 37 into the longitudinal bore in the valve body 11 through a radial passage therein communicating with passage 37.

The soft metal seal of the capsule 32 is pierced, when it is desired to inflate the inflatable article, by means including a cam lever in the form of a bell crank lever 40 having an elongated lever arm which lies generally horizontal (FIGS. 1 and 2) when the lever is in retracted, inoperative position, and a generally vertical, shorter arm having a cam 39 on its lower end. The lever 40 is pivotally mounted upon a transverse pivot pin 42 which extends from one side of the manifold body to the other and spans a narrow, longitudinally extending lever-receiving slot 49 which extends longitudinally of the body 22 at the top thereof and downwardly along the right-hand end of the manifold body.

Reciprocably and sealingly mounted in a circular cylindrical bore in body 22 forming a prolongation of the chamber 35 therein, is a needle plunger 41 the enlarged outer end or head of which is in the form of a cam follower 44. Plunger 41 is constantly urged to the right into engagement with the cam 39 by a coil compression spring 48 which acts between the head 44 and an annular shoulder at the left-hand end of the chamber 35. Coaxial of the plunger 41 and forming a part thereof is a capsule seal-piercing needle 43, the sharpened left-hand end of which is spaced from the seal at the end of the neck of the capsule 32 when the lever 40 is in its retracted, inoperative position, as shown in FIGS. 1 and 2.

When it is desired to release the gas from the capsule 32 in order to inflate the inflatable article, the lever 40 is swung clockwise about its mounting pivot shaft 42 until the high point of the cam 39 has passed through the position in which it engages the high point of the cam follower on the end of the head 44 of plunger 41. This causes the piercing needle 43 first to be thrust to the left against the opposition of the spring 48 sufficiently to pierce the seal in the neck of the capsule 32, the spring 48 thereafter thrusting the plunger 41 to the right as the high point of its cam follower end travels downwardly on the cam 39 on lever 40, thereby to open the hole made in the soft metal seal in the neck of the capsule 32 by the needle 43. Such swinging of the lever 40 is accomplished by pulling a handle 45 on a lanyard cord 44, which is secured to the outer end of the longer arm of the lever 40, by a sleeve-like means 46, to be described, in the direction to the right in FIG. 1.

Figure 4:
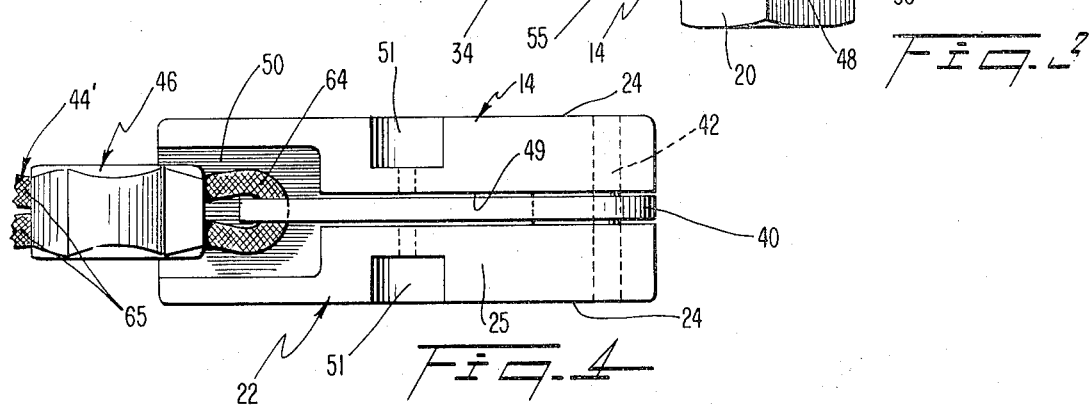
FIG. 4 is a view in plan of the inflation manifold of FIG. 1.

Provision is made for securing the lever 40 in the position of FIGS. 1 and 2 by a wire seal (not shown) of small gauge which extends through a hole in lever 40 and passages in body 22 extending inwardly from oppositely disposed aligned recesses 51 therein. Such seal prevents the unwanted movement of the lever 40 in a seal-piercing direction, but may readily be broken by a deliberate, fairly strong pull exerted upon the handle 45 of the lanyard. As shown in FIG. 4, the body 22 of the manifold is also provided at its upper left-hand corner (FIGS. 1 and 2) with a broader recess 50 into which the outer free end of the lever 40 protrudes, recess 50 receiving the inner end of the cord fastener 46, thereby allowing such fastener to overlie the portion of the body of the capsule 32 adjacent its neck so that it, the lanyard, cord, and the handle 45 are generally out of the way until needed.

Figure 3:
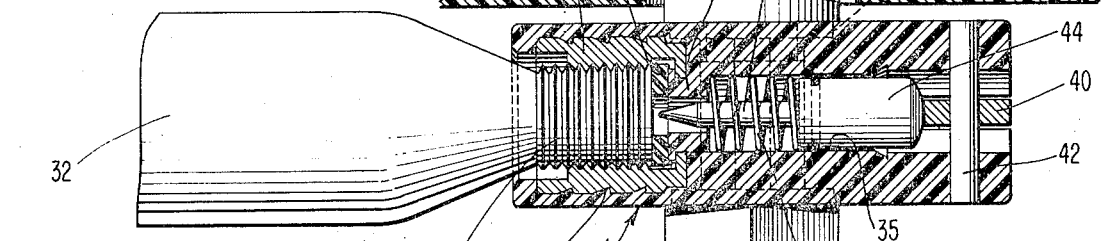
FIG. 3 is a view in transverse, horizontal section, through the inflation manifold, valve body, and mounting flange shown in FIG. 1, certain of the parts being shown in plan.

As shown in FIGS. 2 and 3, a metal insert sleeve 54 is permanently mounted within the body 22 of the manifold 14, the sleeve 54 being internally threaded at 56 so as to receive the threaded neck 34 of the capsule 32. The exterior of the sleeve 54 is provided with annular formations 55 of saw-tooth shape so that the sleeve is strongly mechanically secured to the body 22. In accordance with the invention, although the sleeve 54 is relied upon to mount the capsule 32 on the manifold body 22, such sleeve 54 does not directly act to form any of the gas-conducting passage between the neck of the capsule and the chamber 35 within the manifold when the soft metal seal of the capsule has been pierced.

The inner end of the metal insert sleeve 54 is provided with an annular radially inwardly extending flange 57. In the molding of the body 22 of the manifold, there is provided an axially-directed core (not shown) which defines the passage 36, such core having a diameter substantially less than the diameter of the central passage through the flange 60, so that there is formed a plastic inner sleeve 59 which is integral with the body 22 of the manifold. The core which is employed to support the sleeve 54 during the manifold body molding operation is of such configuration in the portion thereof to the left of the flange 57 on the insert 54 as it is shown in FIG. 2 that there is formed a radially outwardly extending annular plastic flange 60, integral with the outer end of the plastic sleeve 59, and intimately contacting and overlying at least a substantial portion of the radially inner edge of the flange 57. A sealing washer 61 is interposed between the flat annular outer end of the threaded neck 34 of the capsule 32 and the axially outer annular surface of the plastic flange 60. As a result, when the soft metal seal of the capsule neck is pierced, gas from the capsule rushes directly through the central opening in the washer 61, through the passage 36 in the plastic sleeve 59, and into the chamber 35. The possibility of gas leakage either along the threads between the capsule neck and the metal sleeve 54, or between the outer surface of the sleeve 54 and the body 22 of the manifold, is thus virtually eliminated.

The means 46 for fastening the lanyard cord 44 to the outer end of lever 40 is particularly shown in FIGS. 2, 4, and 5. The bight of a loop 64 in the lanyard cord 44 extends through a hole in the outer end of the longer arm of lever 40, the two parallel portions 65 of the cord passing through the fastener 46, which is in the form of a flattened sleeve. Such sleeve is simultaneously crimped transversely at a longitudinally central position 67 and two longitudinally spaced outer zones 69, the sleeve also being simultaneously deformed into a broad V-shaped portion 66. This may be done, for example, by engaging the sleeve by two longitudinally spaced, transverse dies which engage the sleeve near its outer ends on its left-hand surface (FIG. 5) to form indentations 70 in outer zones 69 of the sleeve, while a movable transverse die engages the central portion of the sleeve at its right-hand side to form indentation 67, simultaneously thrusting such central portion of the sleeve as a whole to the left.

As a result of such deformation, not only is the sleeve tightened very forcibly upon the runs 65 of the cord 44 at the zones 67 and 70, but, upon the imposition of a pull on cord 44 in the direction $a$ in FIG. 5, the force $b$ with which the deformed zone 67 of the sleeve engages the runs of the cord is increased. Thus the sleeve fastener 46 retains the cord 44 so securely that there is no possibility of slippage of the cord in the fastener under any service condition, no matter how severe.

The cord fastener of FIG. 5a is similar to that of FIG. 5 but has a longer sleeve with three longitudinally spaced concavo-convex zones. Parts in FIG. 5a which are similar to those of FIG. 5 are designated by the same reference characters with an added prime (').

In FIGS. 6 and 7 there is shown a portion of an injection mold which not only forms the lanyard handle 45 but simultaneously connects it to the lanyard cord 44. In FIG. 7 there is shown a mold half 74 in which there is formed a cavity 75 which, together with a confronting identical cavity 75 in a similar confronting mold half 74' (FIG. 6), defines the handle-forming cavity of the mold. Centrally of the cavity 75 in the mold part 74 there is formed a lanyard cordreceiving channel 78 which has a transverse shape of one-half circular cylinder, channel 78 cooperating with a similar, confronting half-circular cylindrical channel in the other mold half. A supply of lanyard cord is provided at the left-hand side of the mold half 74, the lanyard cord 44 entering the mold through a guide means 76, which cooperates with a similar guide half in the other mold part. A plurality of longitudinally spaced parallel cord-flattening pins 80 are affixed to the mold half 74 centrally of the mold cavity 75 therein. The pins 80 cooperate with similar, aligned confronting pins 80' in the other mold half 74', as shown in FIG. 6. The pins 80, 80' are spaced longitudinally of the central portion of the cavity which is of circular cylindrical shape, there being two opposite wings 85 extending from a generally circular cylindrical portion 84, and a bordering thickened rim on the resulting lanyard handle 45, as shown in FIG. 1.

The lanyard cord 44 in this instance is made of braided nylon filament, which is somewhat slippery and is ordinarily difficult to secure in a mold handle without the provision of bulky, unwanted fastening means. The use of the mold of FIGS. 6 and 7, however, produces a connection between the cord 44 and the handle 45 which exceeds the requirements imposed by commercial specifications for such article. The opposed pins 80, 80' strongly compress the lanyard cord 44 between their confronting inner ends when the mold is closed, as shown in FIG. 6. When the plastic material which is to form the handle 45 is injected under high pressure into the cavity 75, 75', the portions 89 of the cord 44 which lie between the sets of opposed pins 80, 80' is relatively undistorted and thus substantially retain their initial diameter. At the zones of transition between the larger diametered portions of the cord 44 and the flattened portions 87 between the pins 80, 80', there are formed inwardly extending, relatively sharp lips 90 of plastic material which tend endwise to restrict and partially to enclose the larger diametered portions of the lanyard cord within the handle. Not only that, but the pins 80, 80' form holes 86 in the portion 84 of the handle which communicate with the flattened zones 87 of the lanyard cord. Upon the solidification of the handle 45 and the opening of the mold 74, 74', the portions of the lanyard cord at the zones 87 tend to expand into such holes 86 and thus still further key or mechanically connect the lanyard cord to the central portion 84 of the handle. The portion of the cord 84 which protrudes outwardly beyond the larger end of the handle 45 may be then cut off, as by a hot wire cutter.

The body 22 of the manifold 14 may be made of any strong, durable, and impact-resistant material; as noted, it is preferably made as an integral molding of plastic material. Among plastic materials useful for this purpose are acetal resins, sold under the trade name DELRIN by Dupont, and polycarbonate resins, such as those sold under the trademark LEXAN by General Electric Company. The lanyard handle 45 may be made of any suitable strong, tough plastic material such as nylon.

Although the invention is illustrated and described with reference to a single preferred embodiment thereof, it is to be expressly understood that it is in no way limited to the disclosure of such a preferred embodiment, but is capable of numerous modifications within the scope of the appended claims.

What is claimed is:

1. An inflation manifold for flotation bodies of the inflatable type, said manifold being adapted to be mounted on the inflatable article and to inflate the article by the release of compressed gas from a capsule which has a threaded neck with an annular outer end surface and is mounted upon the manifold, the body of the manifold having a gas-conducting chamber therein, the walls of which are molded of plastic material, an internally threaded metal sleeve mounted on the manifold body, said metal sleeve threadedly receiving the neck of the capsule, the metal sleeve having a radially inwardly directed annular flange at its inner end, and a plastic inner sleeve member integral with the wall of the chamber and extending outwardly into the metal sleeve, the plastic sleeve having a radially outwardly directed annular flange overlying at least the radially inner edge of the flange on the metal insert sleeve, the flange on the plastic sleeve being adapted to be sealed to the outer end surface on the capsule.

2. A manifold according to claim 1, wherein the body of the manifold is molded of plastic material, the wall of the chamber being an integral part of said body.

3. A manifold according to claim 2, wherein the metal sleeve is disposed within the body of the manifold and is peripherally enveloped and secured to the plastic material forming the body of the manifold.

* * * * *

UNITED STATES PATENT OFFICE
CERTIFICATE OF CORRECTION

Patent No. 3,809,288      Dated May 7, 1974

Inventor(s) Glenn H. Mackal

It is certified that error appears in the above-identified patent and that said Letters Patent are hereby corrected as shown below:

On the first page of the text,

[45]    "April 30, 1974" should read -- May 7, 1974 --.

Signed and sealed this 10th day of September 1974.

(SEAL)
Attest:

McCOY M. GIBSON, JR.           C. MARSHALL DANN
Attesting Officer              Commissioner of Patents